(12) United States Patent
Carney et al.

(10) Patent No.: US 9,691,294 B2
(45) Date of Patent: Jun. 27, 2017

(54) COMPUTERIZED SYSTEM FOR TEACHING, LEARNING, AND ASSESSING THE KNOWLEDGE OF STEM PRINCIPLES

(71) Applicant: Fluidity Software, Inc., Somerville, MA (US)

(72) Inventors: Donald P. Carney, Somerville, MA (US); Andrew Forsberg, Leominster, MA (US)

(73) Assignee: Fluidity Software, Inc., Somerville, MA (US)

( * ) Notice: Subject to any disclaimer, the term of this patent is extended or adjusted under 35 U.S.C. 154(b) by 0 days.

(21) Appl. No.: 15/341,177

(22) Filed: Nov. 2, 2016

(65) Prior Publication Data

US 2017/0076621 A1 Mar. 16, 2017

Related U.S. Application Data

(62) Division of application No. 14/101,862, filed on Dec. 10, 2013, now Pat. No. 9,576,495.

(60) Provisional application No. 61/736,001, filed on Dec. 11, 2012.

(51) Int. Cl.

| | |
|---|---|
| *G09B 5/12* | (2006.01) |
| *G09B 5/06* | (2006.01) |
| *G09B 5/08* | (2006.01) |
| *G09B 5/14* | (2006.01) |
| *G09B 7/02* | (2006.01) |
| *G09B 7/04* | (2006.01) |
| *G09B 7/06* | (2006.01) |
| *G09B 7/07* | (2006.01) |

(52) U.S. Cl.
CPC ............. *G09B 5/12* (2013.01); *G09B 5/06* (2013.01); *G09B 5/08* (2013.01); *G09B 5/14* (2013.01); *G09B 7/02* (2013.01); *G09B 7/04* (2013.01); *G09B 7/06* (2013.01); *G09B 7/07* (2013.01)

(58) Field of Classification Search
CPC ... G09B 5/12; G09B 5/06; G09B 5/08; G09B 7/07; G09B 7/02; G09B 7/04; G09B 7/06; G09B 5/14
See application file for complete search history.

(56) References Cited

U.S. PATENT DOCUMENTS

| | | | |
|---|---|---|---|
| 5,176,520 A | 1/1993 | Hamilton | 434/350 |
| 6,760,748 B1 | 7/2004 | Hakim | 709/204 |
| 7,213,211 B1 | 5/2007 | Sanders et al. | 715/753 |

(Continued)

*Primary Examiner* — Nathan Hillery
(74) *Attorney, Agent, or Firm* — Bodner & O'Rourke, LLP; Gerald T. Bodner; Christian P. Bodner

(57) ABSTRACT

An on-line teaching, learning and assessing system provides a teacher rapid feedback while teaching a classroom lesson on STEM principles by measuring student progress in learning the principles wherein student progress is measured by students' correct answers to assessment questions. The system includes at least one teacher computer and a plurality of student computers linked to the at least one teacher computer by a communications network. Each computer includes an input device and a touch sensitive screen for receiving handwritten input. The teacher inputs the teacher computer with at least one assessment question and at least one corresponding correct answer to the question, both inputs being handwritten using math expressions and STEM sketches. The student inputs the student computer with at least one student answer corresponding to the assessment question, the answer being handwritten using math expressions and STEM sketches.

3 Claims, 6 Drawing Sheets

(56) References Cited

U.S. PATENT DOCUMENTS

| | | | |
|---|---|---|---|
| 7,466,958 B2 | 12/2008 | Dunk et al. | 434/362 |
| 7,752,148 B2 | 7/2010 | Yu et al. | 706/12 |
| 2004/0157203 A1 | 8/2004 | Dunk et al. | 434/350 |
| 2004/0267607 A1 | 12/2004 | Maddux | 705/7.42 |
| 2006/0024649 A1 | 2/2006 | Vernon | 434/201 |
| 2009/0018979 A1 | 1/2009 | Yu et al. | 706/12 |
| 2010/0225602 A1 | 9/2010 | Fujimura | 345/173 |
| 2011/0159465 A1 | 6/2011 | Gutridge | 434/154 |
| 2011/0234516 A1 | 9/2011 | Nakajima et al. | 345/173 |
| 2011/0244434 A1 | 10/2011 | Livne et al. | 434/188 |
| 2013/0164726 A1 | 6/2013 | Michalowski et al. | 434/362 |
| 2013/0244218 A1 | 9/2013 | Cook et al. | 434/350 |
| 2015/0269859 A1 | 9/2015 | Michalowski et al. | 434/362 |

COMPUTERIZED SYSTEM FOR TEACHING, LEARNING, AND ASSESSING THE KNOWLEDGE OF STEM PRINCIPLES

CROSS-REFERENCE TO RELATED APPLICATIONS

This application is a divisional of U.S. patent application Ser. No. 14/101,862, filed on Dec. 10, 2013, and entitled "Computerized System and Method For Teaching, Learning, and Assessing the Knowledge of Stem Principles", which claims the benefit of priority under 35 U.S.C. 119 and/or 35 U.S.C. 120 to U.S. Provisional Application Ser. No. 61/736,001, filed on Dec. 11, 2012, and entitled "A Teaching Tool for Teaching, Learning, and Assessing the Knowledge of STEM Principles", the disclosure of each of which is incorporated herein by reference and on which priority is hereby claimed.

BACKGROUND OF THE INVENTION

Field of the Invention

This invention relates to teaching tools for the teaching, learning, and assessing of student understanding of Science, Technology, Engineering and Mathematics (STEM) subjects, and, more particularly, relates to tools which utilize a touch sensitive computer screen to teach, learn, and assess student understanding of STEM subjects.

Description of Related Art

In the field of education, devices or systems of cooperating devices which are used to enhance teaching and learning are commonly referred to as either teaching tools or teaching interventions. Furthermore, the evaluation of certain aspects of an educational process, such as subject matter questions or achievement tests administered to students, is commonly referred to as an assessment.

Currently, various tools or interventions, as they are called in the art, are used to teach and motivate the learning of mathematical and physical concepts. These tools include chalkboard, whiteboard, graphing calculator, personal computers, pen-enabled tablet computers, Interactive Whiteboards (IWB), computational mathematics engines, concept visualization software tools, and the experimental laboratory. Whereas each of these tools individually engages students in its own way, a physical disconnect exists between them. For example, a graphing calculator is separate and distinct from a chalkboard and each of these tools requires different expertise to use. When a teacher switches from tool to tool, the change interrupts the flow of teaching and distracts students.

Recently, mobile tablets with touch sensitive screens (for example, iPad™ devices, Android™ devices, and similar devices), because of their low cost, are becoming ubiquitous in classroom environments. Teachers and students are using the didactic features of tablets to teach and learn STEM subjects wherein notation is an important requirement. For example, entering a math notation, such as $$x = \frac{-b \pm \sqrt{b^2 - 4ac}}{2a},$$

is more difficult and time consuming when entering these types of expressions into a computer using a keyboard and mouse compared to a user inputting the touch sensitive screen of a tablet with a stylus or fingertip, as if using paper and pencil.

Teachers of STEM subjects recognize the need for frequent assessments of student progress in understanding the principles being taught and teachers administer such assessments or quizzes in class even though they usually lead to distracting tool changes. For example, when a teacher is teaching a class using one or more of the teaching tools such as those mentioned above and spontaneously decides to ascertain whether the students are grasping what is being taught, the teacher does not have a convenient means by which to measure simultaneously the understanding of all of the students in the class. In order to assess all of the students, the teacher typically asks the students to provide a handwritten answer to a question. This requires the students to use a paper and pencil to answer the question and requires the teacher to collect and evaluate the answers, a process which is time consuming and interrupts the flow of teaching. A tool is needed in the art which minimizes these interruptions in the flow of teaching and, in particular, enables teachers to evaluate frequently class progress in understanding STEM principles without having to switch tools to make the assessments.

What follows are descriptions of products which are known in the industry and which are currently available as computerized teaching interventions for the teaching of STEM subjects:

Graphing calculators have been widely adopted in classrooms because of their computational power, but they require significant training before users (both students and teachers) become experts at finding the complicated sequence of button pushes needed to solve and graph problems.

Microsoft Math™ is graphing calculator software targeted toward use in math education. Even though its interface is tablet PC enabled and incorporates rudimentary entry of handwritten math, it is not a fully pen-centric application. The application requires keyboard entry for effective use. Also, the Microsoft Math™ software product does not offer ease of entry of mathematical notation, interface commands and free-form drawings.

XThink's MathJournal™ is a Tablet PC application for the type of mathematical problem solving that is performed by engineers and scientists rather than students. It focuses on functionality rather than on an uninterrupted teaching experience.

Interactive Physics™ and The Geometer's SketchPad™ require users to learn an unfamiliar WIMP-based (Windows, Icons, Menu's, Pointers) visual language. This unfamiliar, as compared to pencil and paper, style of interaction makes these programs inaccessible to many casual users, and presents significant usage barriers for classroom and problem solving settings.

Systems such as Mathematica™, Maple™, Matlab™, and MathCad™ are focused primarily on entering mathematics for computation, symbolic mathematics, and illustration. These tools require complex scripting languages for mathematical entry. Although these languages use mathematical notation, they are one dimensional and require unconventional keyboard-based entry which is much less intuitive than using 2D handwritten mathematics. None of these systems let the user create diagrams on the screen of a computer in a natural pencil-and-paper style.

FluidMath™ provides a system for the teaching and learning of STEM subjects through the use of handwritten input into pen-enabled computers. FluidMath™ enables the user of a tablet PC to create, solve, and explore STEM principles all in his own handwriting as if working with pencil and paper. However, FluidMath™ does not teach a system which can administer student assessments as disclosed in the present invention.

None of the systems, devices and software described above provides a teaching intervention which has the computer functionality to interpret answers to assessments which are handwritten with standard math notation on the screen of a pen-enabled computer in order to provide a quick in-class assessment for the teacher to evaluate a class's understanding of STEM principles as they are being taught in class. Finally, none of the aforementioned systems, devices and software has the computer functionality to administer periodic tests in class as well as homework assignments and general achievement tests, and collect students' handwritten solutions, evaluate the students' answers presented in handwritten standard math notation and establish automated performance records for each student.

There are also a number of U.S. patents which disclose teaching systems and methods. For example, U.S. Pat. No. 5,176,520 which issued to Eric Hamilton on Jan. 5, 1993, discloses a computer-assisted instructional information delivery system having at least two stations—one station for an instructor and one or more stations for students. An interactive monitor is positioned in each station. Each interactive monitor displays instructional information in visual form as inputted by a stylus or light pen on the interactive monitor. A network communication system operated by a central processing unit and corresponding software communicates the instructional information from the stylus as inputted on one of the interactive monitors and selectively displays the instructional information simultaneously and concurrently onto any or all of the interactive monitors of the stations.

U.S. Pat. No. 6,760,748, which issued to Omar Hakim on Jul. 6, 2004, discloses an interactive electronic instructional system as a teaching interface between a teacher and students where data is transmitted from the teacher's terminal to the students' terminals. The data is received at the student terminals and is separated into execution data and instructional data. The student terminals are grouped into teams allowing student teams to interact with a group decision. This encourages team participation by shy or otherwise reluctant students. Team answer data is transmitted from one of the student terminals in the team to the teacher's terminal. The teacher monitors team answer data to infer class progress towards a goal. The teacher may modify the instructional data based on the progress.

U.S. Pat. No. 7,213,211, which issued to Sanders et al. on May 1, 2007, discloses a system for knowledge transfer in a group setting and comprises a plurality of participant work areas and a moderator work area. Each of the plurality of participant work areas has at least one corresponding participant input-device, and each of the participant input-devices is adapted to define participant images that are then included on the corresponding participant work area. The moderator work area comprises at least one moderator input-device. The at least one moderator input-device is adapted to define moderator images that are then included on the moderator work area and to select moderator images that are then simultaneously included on each of the plurality of participant work areas. The moderator input-device is further adapted to select participant images from any of the plurality of participant work areas that are then included on the moderator work area.

U.S. Pat. No. 7,466,958, which issued to Dunk et al. on Dec. 16, 2008, discloses an on-line teaching and learning system with rapid change-by-change or real-time reinforcement of student responses to math questions, including monitoring by the teacher of the actual responses as well as their correctness. Equations or expressions are entered by selecting one or more symbols from a menu, selecting one or more symbols using buttons in the application, using one or more hotkeys, and/or entering information in a character bases syntax.

The above-noted products and U.S. patents do not disclose systems which enable teachers to combine the use of pen-enabled computers and handwritten input of math notation to minimize interruptions in the flow of teaching when assessing students' understanding of STEM principles. There is needed in the art a means wherein a teacher can administer an in-class assessment to students using tablet PCs and have the students' handwritten answers automatically collected and evaluated by the intervention, thereby providing a teacher with an in-class report regarding student progress. Finally, there is needed in the art an intervention which can be used to administer homework assignments and periodic tests to the users of pen-enabled computers linked on a network, collect via the network the answers which are handwritten by the users on the screens of their computers, interpret the answers, judge whether they are right or wrong and produce student performance records.

OBJECTS AND SUMMARY OF THE INVENTION

It is an object of the present invention to provide a computerized teaching system and method for the teaching, learning, and assessing of a student's understanding of STEM subjects.

It is another object of the present invention to provide a totally pen-centric system using tablet computers.

It is still another object of the present invention to provide means included in the system to administer assessment questions to evaluate student progress in learning.

It is still another object of the present invention to provide a system and method which enable students to answer assessment questions using handwritten math symbols and math expressions.

It is still another object of the present invention to provide a system and method that can be used to administer an in-class assessment in which the students answer the assessment using handwritten math notation and the system evaluates the answers, thereby providing the teacher with a rapid in-class evaluation of student progress.

It is yet another object of the present invention to provide a system which has the functionality to administer in-class tests, homework assignments, and general achievement tests and to evaluate the students' answers which are in the form of handwritten STEM notation, and to create automated student performance records.

It is yet a further object of the present invention to provide a teaching system and method for the teaching and learning of STEM subjects which overcome the inherent disadvantages of known teaching systems and methods.

The present invention is an on-line teaching, learning and assessing system and method which provide a teacher with rapid feedback while teaching a classroom lesson on STEM principles by measuring student progress in learning the principles wherein student progress is measured by students' correct answers to assessment questions. The system includes at least one teacher computer and a plurality of student computers linked to the at least one teacher computer by a communication network. Each computer includes an input device and a touch sensitive screen for receiving handwritten input. The teacher inputs the teacher computer with at least one assessment question and at least one corresponding correct answer to the question, both inputs being handwritten using math expressions and STEM sketches. The student inputs the student computer with at least one student answer corresponding to the assessment question, the answer being handwritten using math expressions and STEM sketches. The teacher computer reads and interprets the student answers and compares them to the at least one correct answer and displays the number of correct answers received on the screen of the at least one teacher computer, thereby providing the teacher with rapid in-class feedback on student performance. The system may be used in a classroom setting or deployed in a distance-learning environment to administer routine tests, homework assignments, and general achievement tests. Assessment results may be downloaded to a spreadsheet, enabling the teacher computer to store and prepare comprehensive reports on the students in the class being taught by the teacher.

In accordance with one form of the present invention, a computerized teaching system for providing an in-class assessment for evaluating one or more students to determine whether the one or more students are learning STEM principles being taught by a teacher in the class includes a communications network, at least one teacher computer, and at least one student computer. Each of the at least one teacher computer and the at least one student computer includes an input device and a touch sensitive screen for receiving handwritten input via the input device. Furthermore, the at least one student computer is operably connected to the at least one teacher computer via the communications network.

The at least one teacher computer includes a computer-readable storage medium containing program instructions for implementing a teacher administered assessment application comprising one or more program instructions for performing certain steps. These steps include receiving at least one question description handwritten by the teacher in math notation on the screen of the at least one teacher computer; storing the at least one question description; receiving at least one correct answer corresponding to the at least one question description, the at least one correct answer being handwritten by the teacher in math notation on the screen of the teacher computer; storing the at least one correct answer; receiving at least one student response from the at least one student computer via the communications network, the at least one student response being input by the student by handwriting the at least one student response in math notation on the screen of the at least one student computer; reading and interpreting the at least one student response; and comparing the at least one student response to the at least one correct answer corresponding to the question description. If the at least one student response includes a plurality of student responses, an additional step performed by the system is determining and displaying the number of student responses of the plurality of student responses which are correct on the screen of the at least one teacher computer.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Teaching STEM subjects requires that students learn and understand abstract concepts. Teachers often use example problems and hand sketches to describe these concepts. Educators have found that it is advantageous to use Tablet PCs in combination with software applications which optimize the didactic features of Tablet PCs to teach STEM subjects. With the appropriate software applications, teachers can enter standard math notation and hand-sketched diagrams into the touch sensitive screen of a Tablet PC and have their input viewed by all students in the class via a projector and/or viewed by the students operating their own Tablet PCs networked to the teacher's tablet.

Those skilled in the art also recognize that, because STEM concepts are abstract, it is important that students be assessed frequently to ensure they understand the principles as they are being taught. The present invention enables teachers to teach STEM principles using pen-enabled computers and to efficiently assess their students' grasp of these principles while not having to switch from tool to tool when making these assessments.

Figure 1:
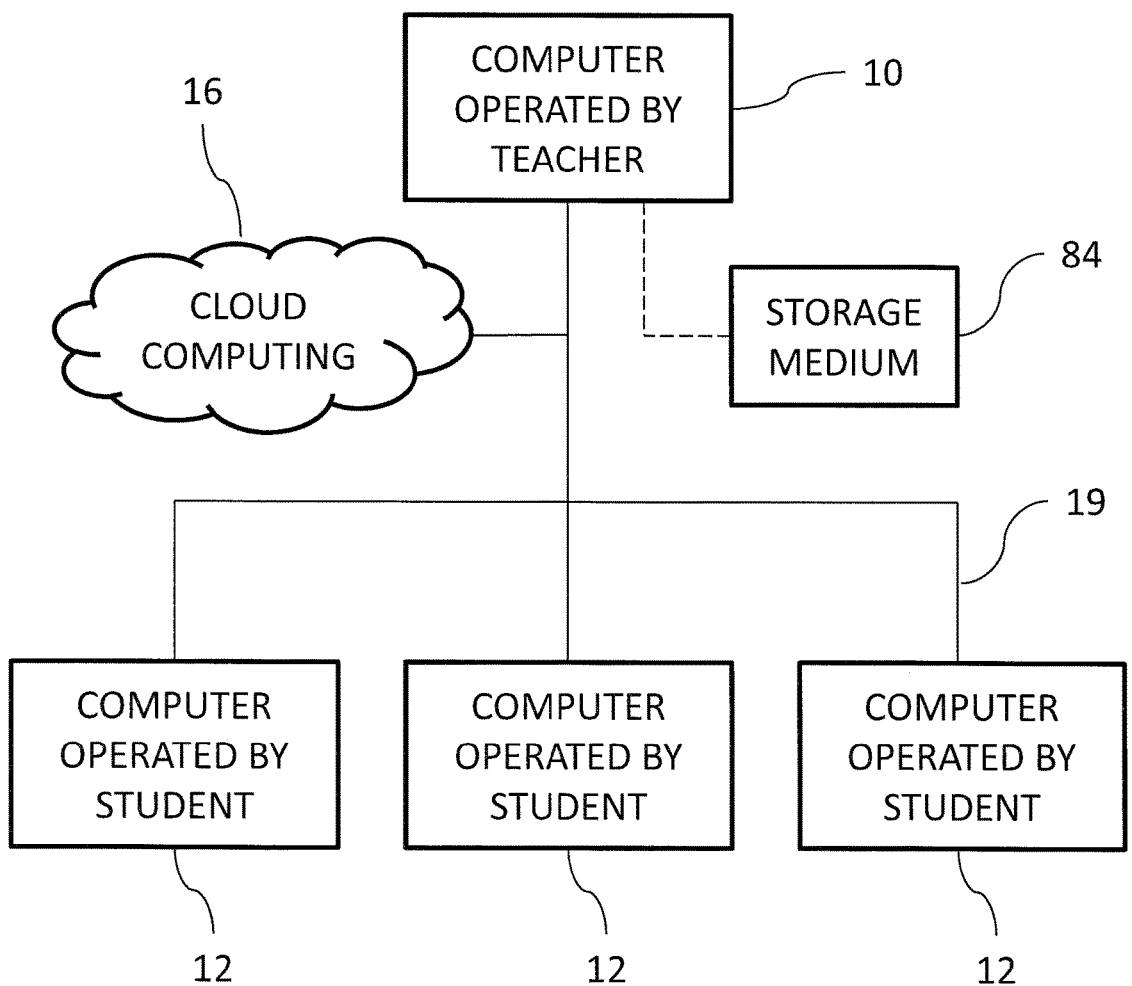
FIG. 1 is a block diagram of a computerized teaching system formed in accordance with the present invention and having a network of computers.

Turning now to the figures, there is shown in FIG. 1 a computerized teaching system formed in accordance with the present invention comprising a network of pen-enabled computers used for the teaching and assessing of STEM subjects. At least one pen-enabled computer 10 operated by a teacher is networked with at least one pen-enabled computer 12 operated by at least one student. The computers are connected by a communications network 19 including any one of, but not limited to, a combination of: a local area network (LAN), a wide area network (WAN), or the World Wide Web (WWW) which includes networking to cloud computing 16. The pen-enabled computers 10 and 12 may be located in one classroom or in remote locations for remote tutoring and learning. As is well known in the art, cloud computing 16 refers to the delivery of computing and storage capacity as a service to a heterogeneous community of end users. Its name comes from a cloud-shaped symbol which is often used to designate the complex infrastructure it contains in system diagrams such as FIG. 1. Its use, in combination with the elements of the present invention, is described in more detail below.

Figure 2:
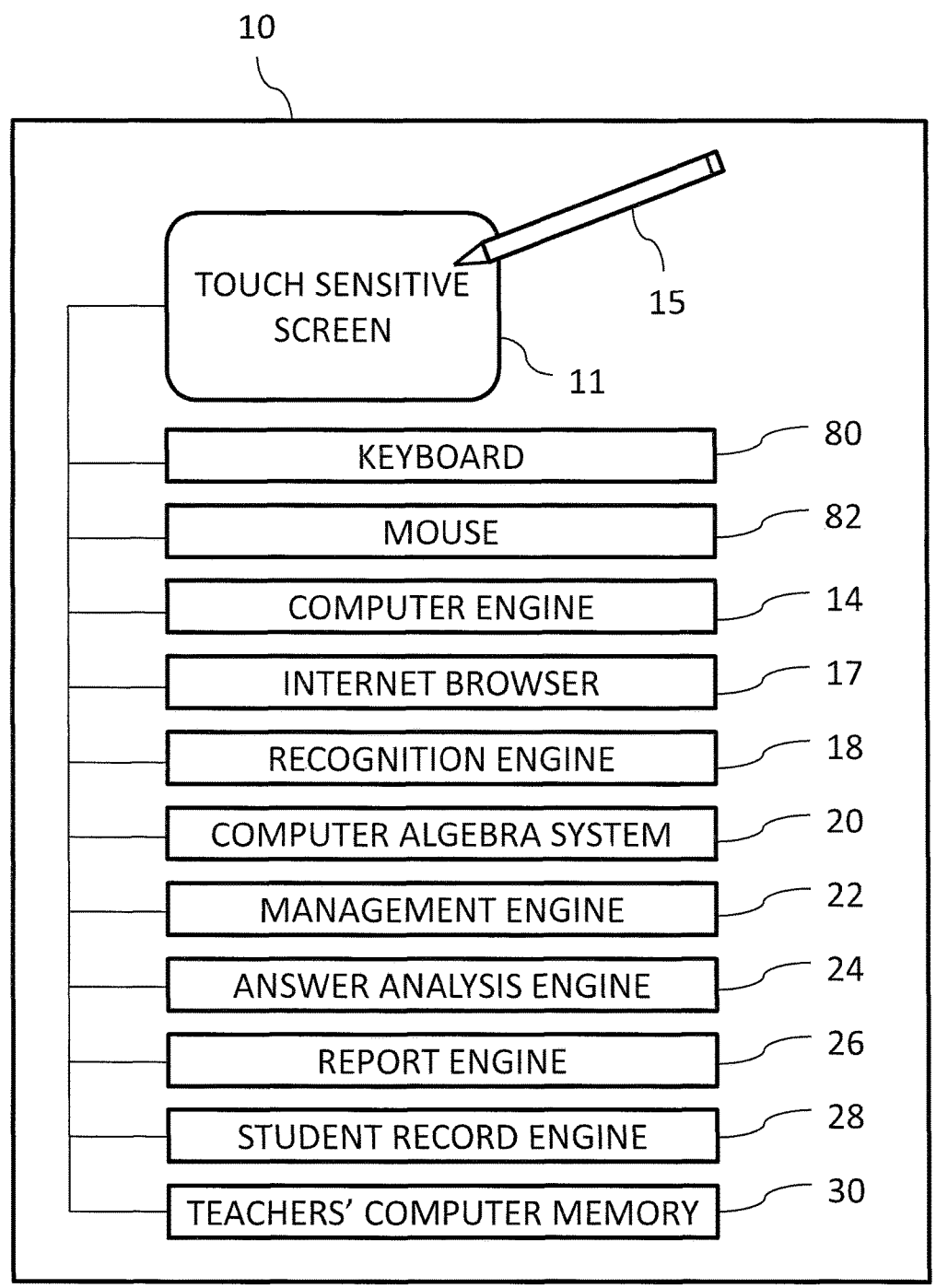
FIG. 2 is a block diagram of the teacher's computer forming part of the system of the present invention.

FIG. 2 is a block diagram of elements included in the pen-enabled computer 10 operated by the teacher. Pen-enabled computers are common in the industry and are commercially available from Hewlett Packard Company of Palo Alto, Calif., Fujitsu of Tokyo, Japan and Dell, Inc. of Round Rock, Tex., to name a few suppliers. These computers are equipped with a keyboard 80 and a mouse 82, a touch-sensitive graphical user interface (GUI), such as a touch sensitive screen 11, and a stylus 15 to provide input from a user. Computers such as these have a built-in computer engine 14 and a computer memory 30 for storing information. There are also commercially available tablet pen-enabled computers which do not have an integral keyboard and mouse and rely solely on their touch sensitive screen for user input. These tablets may be purchased from Apple, Inc. of Cupertino, Calif. (e.g., the iPhone™ device or the iPad™ device) and Dell, Inc. of Round Rock, Tex. (e.g., the various Android™ models), two of many suppliers. This type of tablet is less expensive than the computers mentioned above which have an integral keyboard and mouse. Tablet computers 10 and 12 are typically supplied with a web browser 17. Web browsers are built to well-known industry standards, and the functionality of the computers in which they are installed, as will be described below, may be augmented by cloud computing 16 via their internet browsers 17.

As shown in FIG. 2, a software platform comprising a recognition engine 18 and a Computer Algebra System (CAS) 20 is installed in the pen-enabled computer 10 operated by the teacher. Software platforms such as these are commercially available, e.g., FluidMath™ provided by Fluidity Software, Inc., of Somerville, Mass. Either FluidMath™, or another similar software application, enables the user of a pen-enabled computer to create, solve, graph and animate math and science problems and sketches on the screen of their pen-enabled computer. The recognition engine 18 can read handwritten math formulae and sketches drawn on the screen of the computer, understand the formulae, associate the formulae with the sketches, and create solutions, graphs and dynamic animations. The software platform also includes the general-purpose CAS 20. Mathematical computation, graphing and animation are accomplished with the user interfacing with the CAS 20 through handwritten input via the graphical user interface (GUI) screen 11 of the computer. As is known in the art, pen-enabled computers include features which are advantageous for the teaching and learning of STEM principles.

Those skilled in the art recognize that, when assessing the learning of STEM principles via a quiz, answers written in STEM notation, derived by the student, generally provide a better assessment of student understanding of a STEM principle rather than an answer selected from a multiple choice of answers. Typically, assessments which require answers written in math notation result in teachers and students switching from one intervention to another. Teachers ask students to answer such questions by writing their answers on a piece of paper. Teachers evaluate students' written answers to assess the progress their classes are making in understanding the principles being taught. This process is time consuming and interrupts the flow of teaching in class. The prior art does not address this context switch and does not provide a means wherein the teacher can administer such questions in class and have the students written answers automatically evaluated by a computerized intervention. The prior art does not disclose an intervention which can administer this type of assessment in class in a short period of time thus enabling the teacher to adjust the remainder of his/her lesson based on an in-class assessment.

As shown in FIG. 2, the software of the present invention provides the teacher's tablet computer 10 with the following additional functionality included in the present invention: a network management engine 22, an answer analysis engine 24, a report engine 26 and a student record engine 28. As described below, each of these engines cooperates with the other elements of the pen-enabled computer 10 operated by the teacher. The present invention enables the teacher to automatically administer an assessment to an entire class of students in which the students have pen-enabled computers 12 and are assessed via answers handwritten into the computers 12 operated by the students.

The network management engine 22 enables the teacher to control and administer the computers 10 and 12 in the network 19 to perform the following functions:

a) Store example problems and their solutions in the teacher's computer memory 30.

b) Store assessment quiz questions and their solutions in the teacher's computer memory 30.

c) Select and transmit stored material to the pen-enabled computers 12 operated by the students.

d) Transmit handwritten notation input into the pen-enabled computer 10 operated by the teacher to the pen-enabled computers 12 operated by the students.

e) Enable and disable functionality provided by the pen-enabled computers 12 operated by the students. During the assessment phase of the present invention, the teacher transmits over the network an instruction to the students' computers to disable its problem solving capability so that the student solves the assessment, not his/her computer.

f) Store and evaluate the answers transmitted by the students from their computers 12 to the teacher's computer 10.

The answer analysis engine 24 provides the pen-enabled computer 10 operated by the teacher with the functionality to compare answers provided by the students to correct answers stored in the memory 30 of the teacher's computer 10 and/or generated by the CAS 20. The report engine 26 provides the computer 10 operated by the teacher with the functionality to present reports regarding the students' answers to assessments. The student record engine 28 provides the computer 10 operated by the teacher with the functionality to create individual student performance records for each student in the teacher's classes. The results of the assessments can be downloaded to a spreadsheet and stored therein.

Figure 3:
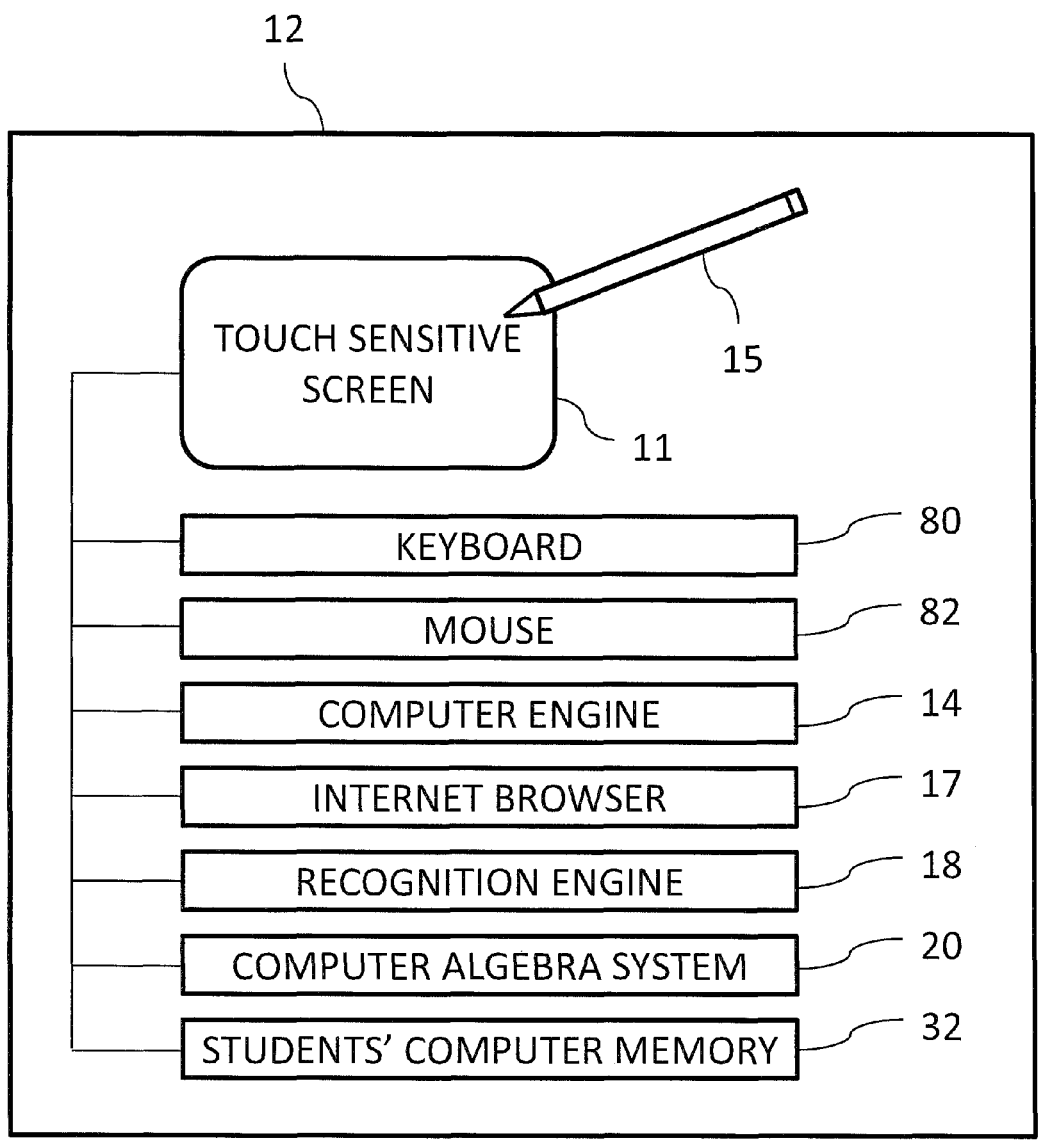
FIG. 3 is a block diagram of the student's computer forming part of the system of the present invention.

As shown in FIG. 3, the pen-enabled computer 12 operated by the student is a commercially available computer similar to the computer 10 (FIG. 2) operated by the teacher having the touch-sensitive screen 11 and the built-in computing engine 14. The student's computer 12 also includes the internet browser 17, the recognition engine 18, the CAS 20 and a student's computer memory 32. The functionality of the student's computer can be augmented by cloud computing 16. The functionalities of the elements in the student's computer 12 have been described above in the description of the teacher's computer 10 and, for the sake of brevity, are not repeated here.

What follows are two examples of how the instant invention may be used by teachers and students as an intervention to teach and assess the learning of STEM principles. Teachers of STEM subjects are familiar with the lesson content typically employed to teach STEM principles through the use of example problems and therefore the details of such lessons are not included herein.

Rather, described below, by way of example, are the didactic features of the computerized system of the present invention embodied in the teacher's computer 10 and the student's computer 12 and how they are employed in the classroom as teaching tools for the teaching and learning of STEM principles. In addition, how these features are used to teach and administer assessments in class using tablet PCs without having to change teaching tools when performing the assessments is further described in detail below.

It is important to note that the recognition engine 18 and the CAS 20 enable the teacher to use the teachers' computer 10 to create spontaneously and solve example problems while teaching a lesson which can be transmitted to the students' computers 12 for presenting the problem. The teacher can also create pre-designed example problems while preparing for a lesson and store them in the teacher's computer 10 for retrieval when teaching a future lesson. In like manner, the teacher can also either spontaneously create assessment quiz problems in class or pre-design them for use in a future lesson. In each case, the teacher's computer stores the answers in STEM notation in the memory 30 of the teacher's computer 10 which can be used as a basis for comparison as to whether a student's answer to an assessment quiz question is correct. During the assessment process the teacher disables the problem solving functionality on the student's computer 12 to make sure the student is not using his/her computer to solve the problem.

Figure 4:
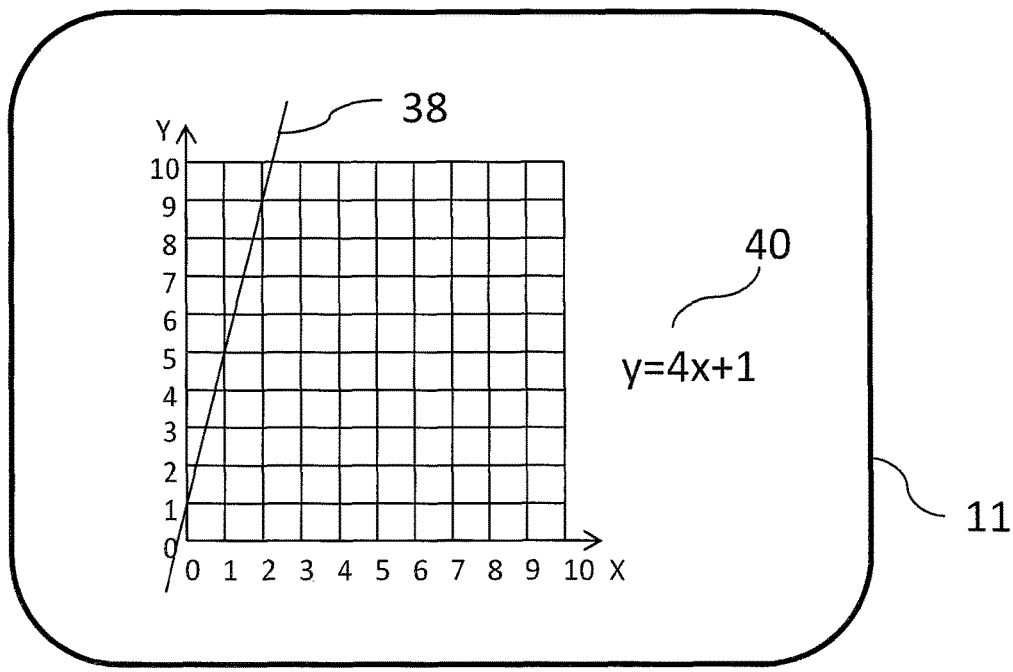
FIG. 4 is a simplified pictorial illustration of the graphical user interface (GUI) display of a student's computer of the system of the present invention showing a graph and an equation to illustrate a first example problem used in the teaching phase of the method of the present invention.

A first example problem (FIG. 4) shown on the display of a student's computer relates to the teaching of basic algebra. In this first example, the teacher is presenting an algebra lesson covering the graphing of a straight line. The teacher is using a teacher's tablet PC 10 and the students are using student tablet PCs 12. The tablet PCs are of the type described above in FIG. 2 and FIG. 3 and are networked together as shown in FIG. 1.

In the first example, the teacher presents the concept of an equation representing a first straight line 38. The graph of the line 38 can either be spontaneously drawn on the screen 11 of the teacher's computer 10 by the teacher or retrieved by the teacher from the memory 30 in the teacher's computer 10 as an example having been previously stored therein by the teacher. The example is transmitted by the teacher's computer 10 for presentation on the student computers 12. An equation 40, y=4x=1, of the first straight line 38, is entered by the teacher onto the diagram of the first example as part of the lesson. The teacher may use other examples and diagrams to define the line 38. Whatever examples the teacher selects, the pen-centric presentation process included in the present invention is easy to use and does not interrupt the teaching flow in the class.

Figure 5:
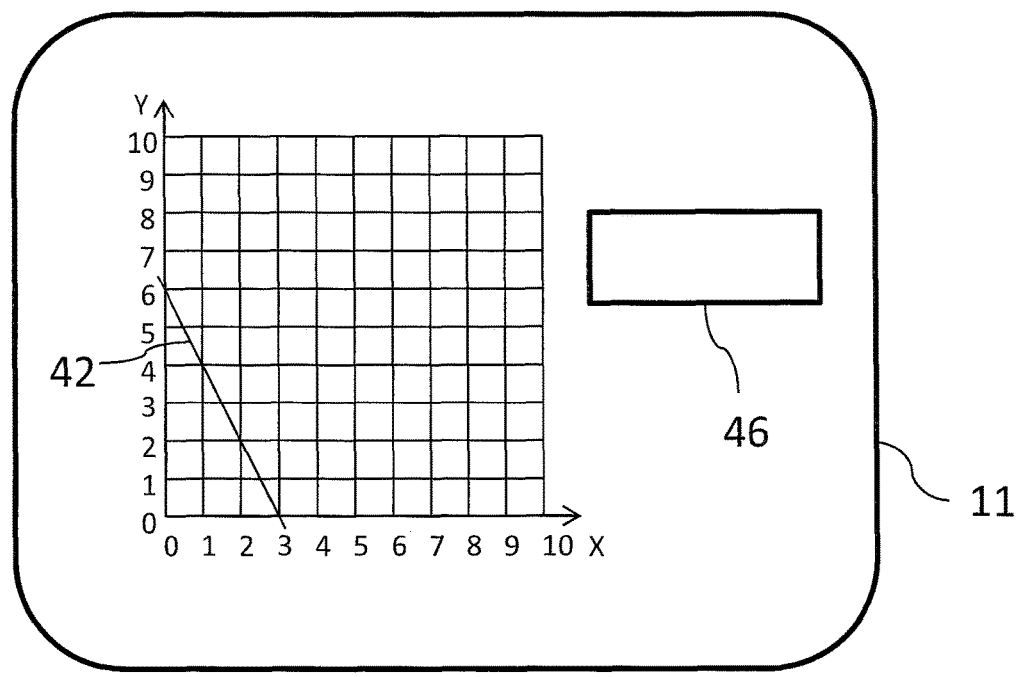
FIG. 5 is a simplified pictorial illustration of the GUI display of a student's computer of the system of the present invention showing another graph and answer box to illustrate a first assessment quiz problem used in the assessment phase of the method of the present invention.

At any time during the lesson, by employing the system and method of the present invention, the teacher can quiz all of the students in his/her class simultaneously to evaluate whether the students are mastering the principles as they are being taught. In the quiz, the teacher assesses all of the students by presenting to the class a first assessment quiz problem, a graph of a second straight line 42, as shown in FIG. 5. As noted above, the quiz problem can either be spontaneously drawn on the display screen of the teacher's computer 10 by the teacher or accessed from its memory 30, by the teacher and presented on the student's computer 12. The assessment presentation process is not time consuming and does not interrupt the flow of teaching. As noted above, the teacher's computer 10 either solves the quiz problem and enters the equation of the correct answer, y=−2x+6, into its memory 30 or the teacher had previously stored it there in anticipation of using this quiz problem in this class. The assessment presented on the student's computer 12 has an empty first answer box 46 in which the teacher asks the students to write, in mathematical notation, their answer to the first assessment question: What is the equation of the line 42 (as show in FIG. 5).

The answer analysis engine 24 in the teacher's computer 10 compares the answer stored in the memory 30 of the teacher's computer to the answers written by the students in the first assessment answer box 46 displayed on the screens of their computers 12. The answer analysis engine 24 is linked to the CAS 20 such that any algebraic equivalent of the correct answer, y=−2x+6, entered into the students' computers 12 will be scored as being correct by the report engine 26 in the teacher's computer 10 which is communicating with the students' computers 12. Examples of correct algebraic equivalents include but are not limited to:

$$y = 6 - 2x \qquad \text{a)}$$

$$y = -\frac{6}{3}x + 6 \qquad \text{b)}$$

$$x = \frac{6 - y}{2} \qquad \text{c)}$$

Figure 6:
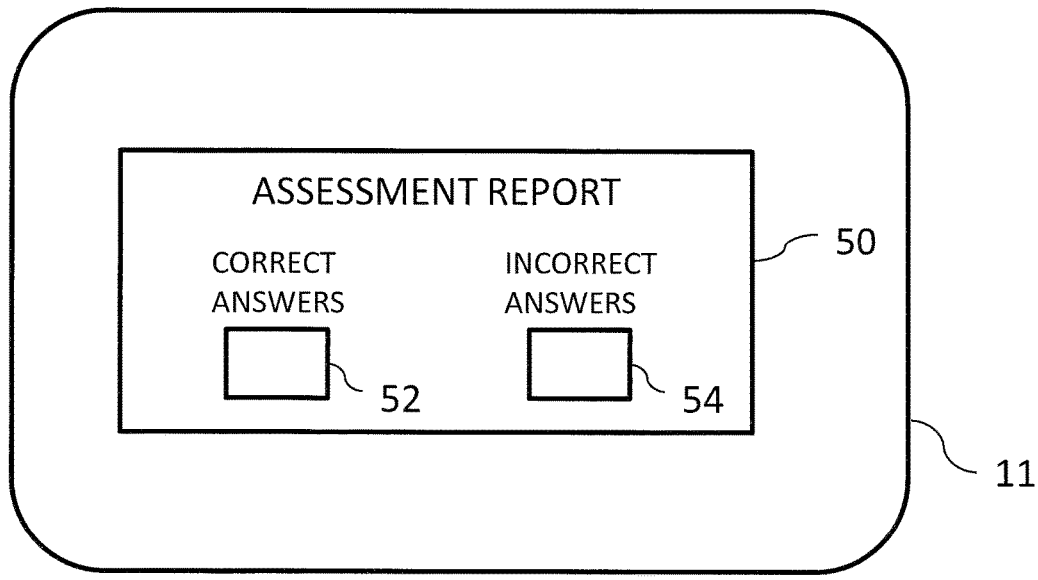
FIG. 6 is a simplified pictorial illustration of the GUI display of a teacher's computer of the system of the present invention illustrating an assessment report.

The answer analysis engine 24 reports these results to the report engine 26, which creates an assessment report 50 on the screen of the teacher's computer 10, as shown in FIG. 6. The report is generated in a relatively short period of time without interrupting the teaching flow in the classroom. The number of students submitting correct answers is shown in box 52, and those submitting incorrect answers is shown in box 54. The teacher assesses the performance of the entire class and can use this assessment as a factor in judging how to proceed with the lesson in progress.

A second example problem (FIG. 7) relates to the teaching of basic Physics, a STEM discipline. In this example, the teacher presents a statics lesson covering the equilibrium of forces on a lever 58. The teacher is using the teacher's tablet PC 10 and the students are using student tablet PCs 12. The tablet PCs are the type described in FIG. 2 and FIG. 3 and are networked as shown in FIG. 1.

In the second example, the teacher presents the concept that the sum of the moments about the fulcrum point A of the lever 58 is equal to zero.

Figure 7:
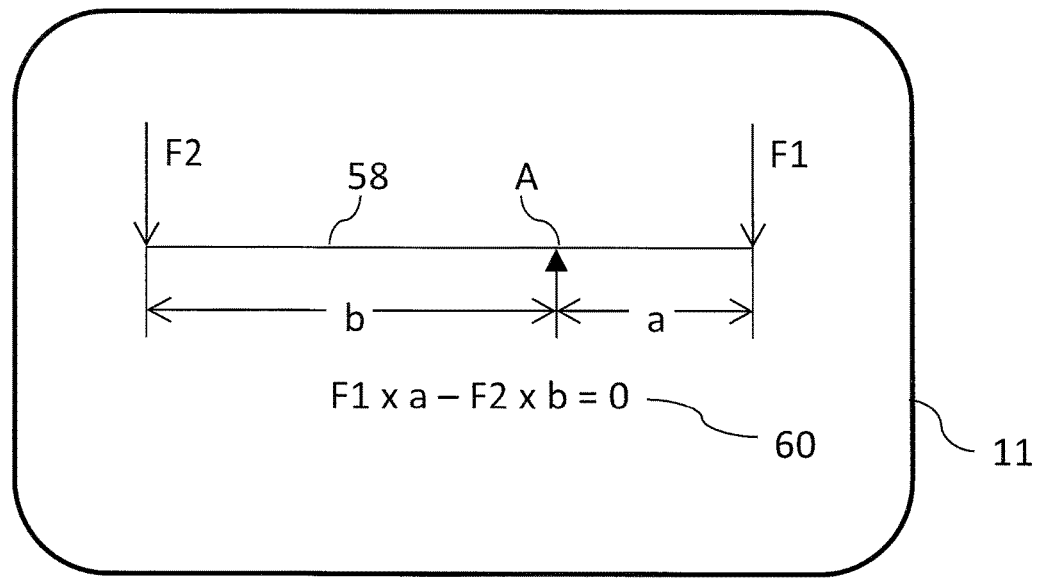
FIG. 7 is a simplified pictorial illustration of the GUI display of the student's computer of the system of the present invention showing a lever and fulcrum diagram and equation to illustrate a second example problem.

The example in FIG. 7 can either be spontaneously drawn on the screen of the teacher's computer 10 or accessed by the teacher from the memory 30 in the teacher's computer 10 and transmitted for presentation on the screen of the student's computer 12. An equation 60 defining the sum of the moments about the fulcrum point A is equal to zero, F1×a−F2×b=0, is entered by the teacher onto the displayed diagram of the second example as part of the lesson. The teacher may use and display other examples and diagrams to define the sum of the moments about the fulcrum point A. Whatever examples the teacher selects, the pen-centric presentation process included in the present invention is easy and quick and does not interrupt the teaching flow in the classroom.

Figure 8:
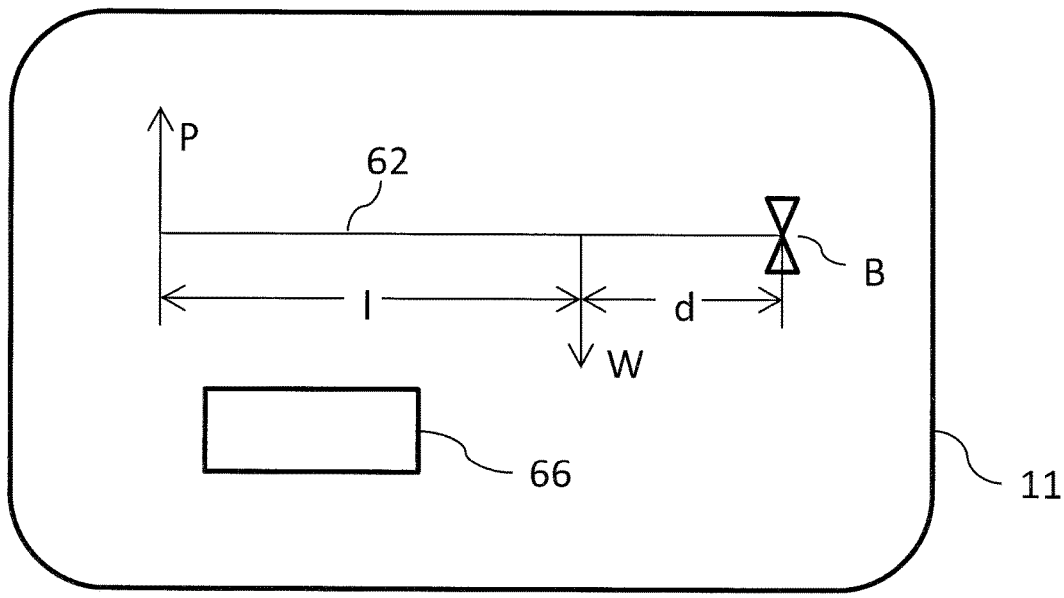
FIG. 8 is a simplified pictorial illustration of the GUI display of the student's computer of the system of the present invention showing a lever and fulcrum diagram and answer box to illustrate a second assessment quiz problem.

At any time during the lesson, by employing the system and method of the present invention, the teacher can assess all of the students in his/her class simultaneously to evaluate whether the students are mastering the principles as they are being taught. In this example, the teacher assesses all of the students by presenting to the class a second assessment quiz question, as shown in FIG. 8. The diagram in FIG. 8 can either be spontaneously drawn on the display screen of the teacher's computer 10 by the teacher or accessed from its memory 30 by the teacher and presented on the students' computers 12. In either case, the assessment process is not time consuming and does not interrupt the flow of teaching. The teacher's computer 12 either solves the assessment problem and enters the equation of the correct answer, P(l+d)−Wd=0, into the memory 30, or the teacher previously had it stored there in anticipation of using this quiz problem in this class. The assessments transmitted to the students' computers 12 do not include the answer. The teacher asks the students to write the answer to the second assessment question in the second assessment answer box 66: What is the equation defining the sum of the moments around the fulcrum point B of the lever 62?

As described above, the teacher's computer 10 evaluates the students' handwritten answers including the algebraic equivalents thereof. Examples of correct algebraic equivalents to the second assessment quiz question include, but are not limited to:

$$P(l+d) = Wd \quad \text{a)}$$

$$P = \frac{Wd}{l+d} \quad \text{b)}$$

$$W = \frac{P(l+d)}{d} \quad \text{c)}$$

Also, as previously described, the teacher's computer 10 provides the assessment report 50 in which the number of correct and incorrect answers is presented to the teacher so that the teacher can evaluate whether the students are learning the STEM principles as they are being taught.

As can be seen from the preceding examples, the computerized teaching system and method of the present invention provide a unique approach to teaching, wherein a teacher or test moderator assesses a person's understanding of scientific or math principles by the person answering test questions via handwritten answers input on a computer having a touch sensitive screen.

Unlike the prior art, the pen-enabled computer system of the present invention enables teachers to not only teach STEM subjects using pen-enabled computer input with their own handwriting but also assess the learning of STEM subjects through students using pen-enabled computers with their own handwritten input answering assessment questions. The answers are submitted in handwritten math notation and are interpreted and automatically graded by the teacher's pen-enabled computer. The present invention enables the teacher to teach and assess using pen-enabled computers and does not require switching to another teaching tool to perform assessments. The system and method of the present invention provide a means for the teacher to quickly assess an entire class during a lesson, which is a functionality that is not provided by any other STEM teaching intervention of which the inventors herein are aware. Using the computerized teaching system and method of the present invention, teachers can also administer routine tests, homework assignments and achievement tests. The answers to the tests and assignments are collected and automatically graded, as in the examples provided above. The results of the assessments can be downloaded to a spreadsheet, enabling the teacher's computer 10 to store and prepare comprehensive reports on all the students being taught by the teacher.

In the assessments described above, the questions are answered by the students writing answers to the questions in math notation, wherein the answer includes one or more of an equation and an expression.

Figure 9:
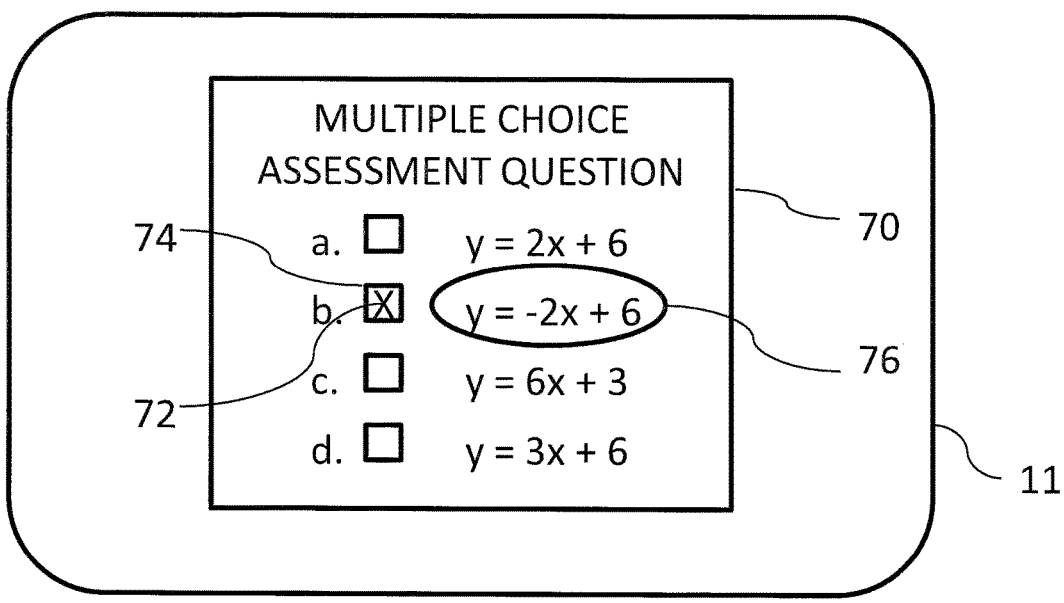
FIG. 9 is a simplified pictorial illustration of the GUI display of the student's computer of the system of the present invention showing several equations and answer boxes to illustrate a multiple choice assessment question.

As an alternative assessment, the system of the present invention provides the teacher an option of presenting the assessment in the form of a multiple choice question, as shown in FIG. 9, which is generally referred to by reference number 70. FIG. 9 relates to the question shown displayed on the student's computer 12 in FIG. 5 and illustrates how the question would appear on the screen 11 of the student computer 12. To answer the question, the student uses the stylus 15 to write an input on the screen 11 of the student computer 12 to designate his or her answer choice. The input may include, but is not limited to, either entering a mark 72 in an input box 74 or drawing a line 76 around his answer choice. The number of correct answers submitted by the students are tallied and the results shown in the assessment report 50, as described previously. Using a multiple choice format, rather than having the student create his own handwritten answer, including a math expression, expedites the assessment and enables the teacher to quickly evaluate the students' grasp of the material being taught.

The current explosive growth of tablet PCs with touch sensitive screens has led to a broad range of commercially available tablets along with a variety of operating systems provided in these tablets. Some of these operating systems may not support the software platform (the recognition engine 18 and the CAS 20) of the system of the present invention. However, most commercially available tablets are supplied with an internet browser 17 (FIG. 2). In the present invention, the cloud computer 16 has installed therein the software platform necessary to support the functionality of the present invention. The internet browser 17 communicates with the cloud computer 16 to access the internet platform stored therein, thereby providing the functionality required in the system and method of the present invention. Regardless of what operating system with which the tablet computer is supplied, as long as it has a web browser, it will be operable in accordance with the method and system of the present invention and as described herein. Accessing the cloud 16 and the calculations performed therein are entirely transparent to the users.

The logic and software for carrying out the functions of the teacher computer 10 and/or the student computers 12, and to create the various engines described previously therein, may be embodied on a computer-readable storage medium 84, which is received by, interfaces with, or forms part of, the teacher computer 10 and/or the student computers 12. It should be understood that such computer-readable storage medium 84 includes, and may be realized as, a computer/compact disc (CD), a digital versatile/video disc (DVD), a read only memory (ROM), a programmable read only memory (PROM), an electrically erasable programmable read only memory (EEPROM), a random access memory (RAM) and like devices.

Although it is disclosed herein that the computer-readable storage medium 84 preferably resides on or is received by the at least one teacher computer 10, it is envisioned to be within the scope of the present invention to have the storage medium 84 residing on or being received by one or more student computers 12, or on the servers or computers which are associated with or perform the function of the cloud computing 16. Furthermore, one or more of the student computers 12 or the cloud computers or remote computers may be structured to include the same features and functionality of the teacher computer 10, including a keyboard 80, mouse 82, or a touch sensitive screen 11 and stylus 15, a management engine 22, an answer analysis engine 24, a report engine 26 and a student record engine 28, such that the functions of the teacher computer 10 may be performed by the one or more student computers 12, and any reports may be generated by the one or more student computers 12 and communicated to, and displayed on the display of, the teacher computer 10.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A computerized teaching system for providing an in-class assessment for evaluating one or more students to determine whether the one or more students are learning STEM principles being taught by a teacher in a class, the system comprising:
   a communications network;
   at least one teacher computer; and
   at least one student computer having problem solving capability;
   wherein each of the at least one teacher computer and the at least one student computer includes an input device and a touch sensitive screen for receiving handwritten input via the input device;
   wherein the at least one student computer is operably connected to the at least one teacher computer via the communications network;
   wherein the at least one teacher computer includes a computer-readable storage medium containing program instructions for implementing a teacher administered assessment application comprising one or more program instructions for performing the steps of:
   receiving at least one question description handwritten by the teacher in math notation on the screen of the at least one teacher computer;
   storing the at least one question description;
   transmitting over the communications network an instruction to the at least one student computer to disable the problem solving capability of the at least one student computer;
   receiving at least one correct answer corresponding to the at least one question description, the at least one correct answer being handwritten by the teacher in math notation on the screen of the at least one teacher computer;
   storing the at least one correct answer;
   receiving at least one student response from the at least one student computer via the communications network, the at least one student response being input by the student by handwriting the at least one student response in math notation on the screen of the at least one student computer;
   reading and interpreting the at least one student response;
   comparing the at least one student response to the at least one correct answer corresponding to the at least one question description; and
   when the at least one student response includes a plurality of student responses, determining and displaying the number of student responses of the plurality of student responses which are correct on the screen of the at least one teacher computer.

2. A computerized teaching system for providing an in-class assessment for evaluating one or more students to determine whether the one or more students are learning STEM principles being taught by a teacher in the class, the system comprising:
   a communications network;
   at least one teacher computer; and
   at least one student computer having problem solving capability;
   wherein each of the at least one teacher computer and the at least one student computer includes an input device and a touch sensitive screen for receiving handwritten input via the input device;
   wherein the at least one student computer is operably connected to the at least one teacher computer via the communications network;
   wherein the at least one teacher computer includes a first computer-readable storage medium containing program instructions for implementing a teacher administered assessment application comprising one or more program instructions for performing the steps of:
   receiving at least one question description handwritten by the teacher in math notation on the screen of the at least one teacher computer;
   storing the at least one question description;
   receiving at least one correct answer corresponding to the at least one question description, the at least one correct answer being handwritten by the teacher in math notation on the screen of the at least one teacher computer;
   storing the at least one correct answer;
   transmitting over the communications network an instruction to the at least one student computer to disable the problem solving capability of the at least one student computer;
   wherein the at least one teacher computer includes an answer analysis engine having a second computer-readable storage medium containing program instructions for implementing a comparison application comprising one or more program instructions for performing the steps of:
   receiving at least one student response from the at least one student computer via the communications network, the at least one student response being input by the student by handwriting the at least one student response in math notation on the screen of the at least one student computer;
   reading and interpreting the at least one student response;
   comparing the at least one student response to the at least one correct answer corresponding to the at least one question description; and
   when the at least one student response includes a plurality of student responses, determining and displaying the number of student responses of the plurality of student responses which are correct on the screen of the at least one teacher computer.

3. A computerized teaching system for providing an in-class assessment for evaluating one or more students to determine whether the one or more students are learning STEM principles being taught by a teacher in a class, the system comprising:
   a communications network;
   at least one teacher computer; and at least one student computer having problem solving capability;

wherein each of the at least one teacher computer and the at least one student computer includes an input device for receiving input via the input device and a display;

wherein the at least one student computer is operably connected to the at least one teacher computer via the communications network;

wherein the at least one teacher computer includes a computer-readable storage medium containing program instructions for implementing a teacher administered assessment application comprising one or more program instructions for performing the steps of:

receiving at least one question description input by the teacher using the input device of the at least one teacher computer;

storing the at least one question description;

receiving at least one correct answer corresponding to the at least one question description, the at least one correct answer being input by the teacher using the input device of the at least one teacher computer;

storing the at least one correct answer;

transmitting over the communications network an instruction to the at least one student computer to disable the problem solving capability of the at least one student computer;

receiving at least one student response from the at least one student computer via the communications network, the at least one student response being input by the student using the input device of the at least one student computer;

reading and interpreting the at least one student response;

comparing the at least one student response to the at least one correct answer corresponding to the at least one question description; and when the at least one student response includes a plurality of student responses, determining and displaying the number of student responses of the plurality of student responses which are correct on the display of the at least one teacher computer.

\* \* \* \* \*